United States Patent Office 2,866,816
Patented Dec. 30, 1958

2,866,816

PRODUCTION OF ARYLOXY COMPOUNDS

Basil Jason Heywood, Hornchurch, England, assignor to May & Baker Limited, Dagenham, England, a British company No Drawing. Application April 20, 1956
Serial No. 579,451

Claims priority, application Great Britain April 22, 1955

6 Claims. (Cl. 260—521)

This invention is for improvements in or relating to the production of aryloxy acids and salts thereof and more particularly concerns the provision of a new process for the production of γ-aryloxybutyric acids and salts thereof in which the aryl nucleus may be substituted by, for example, one or more halogen atoms, e. g. chlorine atoms, or lower alkyl groups, e. g. methyl groups, and in which the aliphatic side chain may be substituted by one or more hydrocarbon groups, e. g. methyl or phenyl groups.

The said γ-aryloxybutyric acids and their salts are useful organic intermediates and some of them, especially γ-4-chloro-2-methylphenoxy- and γ-2:4-dichlorophenoxybutyric acids and their simple derivatives, such as alkali metal salts, also possess plant-growth regulating properties.

The method generally employed hitherto for the production of γ-aryloxybutyric acids has involved the condensation of an alkali metal salt of the corresponding phenol with trimethylene bromide to give an aryloxypropyl bromide which is then treated with an alkali metal cyanide to form an aryloxybutyonitrile yielding on hydrolysis the corresponding butyric acid.

In an endeavor to provide a more commercially advantageous method of manufacturing the said γ-aryloxybutyric acids (in the form of alkali metal salt), the present applicant has conducted research and experimentation on the interaction at elevated temperature of the alkali metal salts, for example, the sodium salts, of the corresponding phenols with butyrolactones under substantially anhydrous conditions.

This method yields the desired acid (as alkali metal salt) in a single step. The free acid or derivatives other than alkili metal salts may be readily obtained by treating an alkali metal salt, or the crude reaction product containing it, in manner known per se for the isolation of a carboxylic acid or derivative in question from a corresponding alkali metal salt or medium containing such salt.

The process of the present invention has considerable economic advantages over the method generally employed hitherto by virtue of the fact that it involves fewer process steps, giving higher yields and that the butyrolactones employed as starting materials are both readily available and comparatively inexpensive.

Research and experimentation has shown, however, that the presence of more than a very small proportion of water in the reaction mixture is detrimental to the yield of the desired product and that, therefore, the starting materials must be as dry as possible in order to obtain the best yields.

According to the present invention, it has now been found that the alkali metal phenoxides, which are conveniently prepared by treating the corresponding phenol with alkali, may be advantageously dehydrated by co-distillation with an entrainer, consisting of a monohydric alcohol with a boiling point between 99° and 140° C. at atmospheric pressure.

According to a preferred method of carrying out the invention a phenol is treated with alkali and the reaction mixture is dehydrated by co-distillation with the monohydric alcohol entrainer, to give a substantially anhydrous mixture of the alkali metal phenoxide and the entrainer, whereupon the butyrol actone is added, the greater part of the entrainer removed by distillation and the residue then heated, preferably at a temperature higher than 140° C. and preferably within the range 140–210° C. The γ-aryloxybutyric acid may then be separated by diluting the mixture with water and acidifying to liberate any unreacted phenol, removing the latter by steam distillation, redissolving the butyric acid in alkali and precipitating it by the addition of acid. Alternatively, the unreacted phenol can be removed by steam distillation of an approximately neutral solution of the reaction mixture in water. In certain cases, especially when the reaction is carried out in the range of temperature of 170–210° C., the reaction may go to completion, thus obviating any necessity for removal of unreacted phenol. This is a considerable advantage in practice.

In carrying out the process described in the immediately preceding paragraph it is convenient to add solid alkali to a solution of the phenol in the entrainer (when the latter is a liquid in which the phenol is soluble) and to apply heat so that the entrainer carries off the water formed in the reaction.

According to a further embodiment of carrying out the invention, the butyrolactone is present during the co-distillation step. For example, the appropriate phenol, an alkali, butyrolactone and entrainer may be heated together so that the azeotrope and the entrainer are successively distilled off, whereafter the temperature is raised to that required for reaction to take place between the phenoxide and the butyrolactone.

The monohydric alcohols employed as entrainers in accordance with the invention comprise those containing 4 or 5 carbon atoms, of which examples are n-butanol, iso-butanol, n-pentanol and iso-pentanol. It would have been expected that, because of the hydroxyl group, they would interfere with the reaction but surprisingly they do not and, in fact, offer substantial advantage over such non-hydroxylic entrainers as white spirit, xylene and so forth. More particularly, the entrainers of the invention, especially n-butanol, are of outstanding utility for the purpose of the invention for the following reasons:

(1) The alkali phenates in question are fairly soluble in the alcohol so that often no separation of solid occurs;

(2) The alkali aryloxy acid salts in question are also fairly soluble in the alcohol and again the separation of the solid is minimized;

(3) Solid sodium or potassium hydroxide can be used in place of the solution, resulting in saving of time required for dehydrating the salt;

(4) Only one reaction vessel is required;

(5) An excess of the butyrolactone is no longer necessary; and (6) The hazard associated with the excessively rapid separation of the alkali metal salts of the phenol is eliminated.

In contradistinction, when using non-hydroxylic solvents, there is always substantial separation of solid causing processing difficulties and a substantial explosion hazard due to the possibility of a sudden separation of solid and liberation of heat.

The ease with which the reaction mixture may be stirred throughout the reaction, which is a characteristic of the process of the invention is especially apparent when using n-butanol as the entrainer.

The invention is illustrated by the following examples.

Example I

Solid sodium hydroxide (1.05 moles) is added to a stirred solution of 4-chlorophenol (1 mole) in n-butanol. The temperature of the reaction mixture is gradually increased to boiling point and the sodium hydroxide dissolves as sodium 4-chlorophenate. The n-butanol is allowed to distil off until the internal temperature reaches 155° C. The mixture is allowed to cool to about 150° C. and butyrolactone (1.00 mole) is added. The butanol is distilled off until the temperature of the reaction is 160° C. The mixture is then refluxed at about this temperature for four hours and then water (1.5 l.) is added without cooling. Concentrated sulphuric acid is then added until the mixture reaches pH 8.5 and the aqueous mixture is steam distilled to remove the butanol and unreacted phenol. After cooling, the product is precipitated by the addition of sulphuric acid, washed with water and dried at 55° C. Recrystallisation from petroleum ether gives γ-4-chlorophenoxybutyric acid, M. P. 120° C. The yield was 87% (based on either the phenol or the lactone).

Similarly prepared were γ-2:4-dichlorophenoxybutyric acid M. P. 118° C., yield 75%, γ-3:4-dichlorophenoxybutyric acid M. P. 108–110° C., yield 75% and γ-2:4:5-trichlorophenoxybutyric acid M. P. 114° C., yield 50%.

Example II

Solid sodium hydroxide (21 g.), 4-chloro-2-methylphenol (71.25 g.) and n-butanol (200 cc.) are heated together in a flask and the n-butanol/water mixture allowed to distil out until the temperature of the clear pale amber solution is 155° C. Butyrolactone (40.1 cc.) was run in fairly rapidly from a dropping funnel. n-Butanol is again allowed to distil out until the reaction mixture is again at 155° C. The solution is held at this temperature for 4 hours, the n-butanol being allowed to reflux. Water is added to the clear stirred solution to give a concentrated solution of sodium γ-4-chloro-2-methylphenoxybutyrate. The small amount of unreacted phenol can be removed by extraction with petroleum or by steam-distillation. This solution can be used as such for use in making up herbicidal compositions or, if desired, the acid can be precipitated out by the addition of dilute hydrochloric acid. The yield is 101.5 g. or 89% of theory based on 4-chloro-2-methylphenol. The melting point of the γ-4-chloro-2-methylphenoxybutyric acid is 95.7° C. compared with 100–1° C. for the pure material. If the amount of butyrolactone is increased to 47.8 cc. (25% molar excess) the yield based on 4-chloro-2-methylphenol is 96.5%.

Other lactones that may be used in n-butanol media are γ-valerolactone and γ-phenyl-γ-butyrolactone to give γ-4-chloro-2-methylphenoxy-γ-methylbutyric acid and γ-4-chloro-2-methylphenoxy-γ-phenyl butyric acid respectively.

Using iso-butanol (2 x 200 mls.) and n-pentanol (2 x 200 mls.) respectively in place of n-butanol and replacing the 4-chlorophenol by an equivalent quantity of 2:4-dichlorophenol and following the procedure of Example I there was obtained in each case a yield of 71.5% of γ-(2:4-dichlorophenoxy)-butyric acid.

Using iso-butanol (3 x 200 mls.) and n-pentanol (2 x 200 mls.) in place of the n-butanol of Example II there were obtained yields of 100% and 92.5% of product melting at 95–7° C. and 93–5° C. respectively.

I claim:

1. A process for the preparation of γ-phenoxybutyric acids in the form of alkali salts thereof which comprises adding γ-butyrolactone to a substantially anhydrous mixture of an alkali metal derivative of a phenol selected from the group consisting of phenol and its halogen and lower alkyl substitution derivatives and a monohydric alcohol boiling between 99 and 140° C. at atmospheric pressure, removing by distillation the greater part of the alcohol and heating the residue to a temperature higher than 140° C.

2. A process according to claim 1 wherein the phenol is 4-chloro-2-methylphenol.

3. A process according to claim 1 wherein the phenol is 2:4-dichlorophenol.

4. A process according to claim 1 wherein unsubstituted γ-butyrolactone is employed.

5. A process according to claim 1 wherein the monohydric alcohol is n-butanol.

6. A process for the preparation of γ-4-chloro-2-methylphenoxybutyric acid in the form of an alkali salt thereof which comprises adding γ-butyrolactone to a substantially anhydrous mixture of 4-chloro-2-methylphenol and n-butanol, removing by distillation the greater part of the n-butanol and heating the residue to a temperature higher than 140° C.

References Cited in the file of this patent

UNITED STATES PATENTS

| | | |
|---|---|---|
| 2,449,991 | Gresham et al. | Sept. 28, 1948 |
| 2,769,833 | Weil | Nov. 6, 1956 |